United States Patent [19]

Eitel

[11] 4,262,046
[45] Apr. 14, 1981

[54] LIGHTWEIGHT PROTECTIVE STRUCTURE

[76] Inventor: Frederick G. Eitel, 912 Evergreen Dr., North Palm Beach, Fla. 33408

[21] Appl. No.: 72,827

[22] Filed: Sep. 6, 1979

[51] Int. Cl.³ .............................. B32B 1/06; B32B 3/26
[52] U.S. Cl. ...................................... 428/69; 2/243 R; 156/145; 428/71; 428/76; 428/79; 428/137; 428/159; 428/162; 428/166; 428/172; 428/178; 428/322
[58] Field of Search .............. 428/156, 166, 178, 322, 428/158, 159, 172, 137, 71, 72, 76, 69; 156/145–147; 5/449, 461; 2/243 R, 412

[56] References Cited
U.S. PATENT DOCUMENTS

| 1,970,803 | 8/1934 | Johnson | 156/145 |
| 2,781,820 | 2/1957 | Rogers | 428/178 |
| 3,011,930 | 12/1961 | Dworak | 156/145 |
| 3,813,279 | 5/1974 | Varner, Jr. | 428/178 |

Primary Examiner—Paul J. Thibodeau

[57] ABSTRACT

A protective structure is disclosed which provides a compound cushioning effect to impact-loading from an external source. The structure comprises a plurality of cells formed between two layers of plastic film material. The cells contain a sealed-in pneumatic substance which substantially surrounds a core of low density, plastic foam material. Vents may be provided through the layers' intermediate adjacent cells to provide for the flow of air. A cover of fabric material may be provided over the layers of plastic film material depending on the desired use of the structure.

9 Claims, 4 Drawing Figures

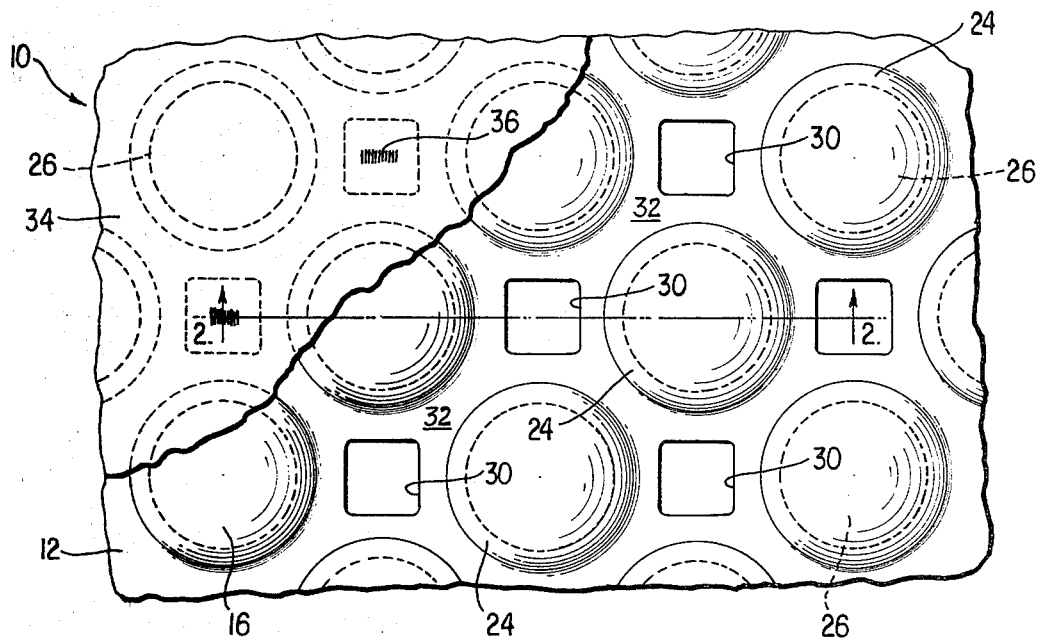
FIG. 1
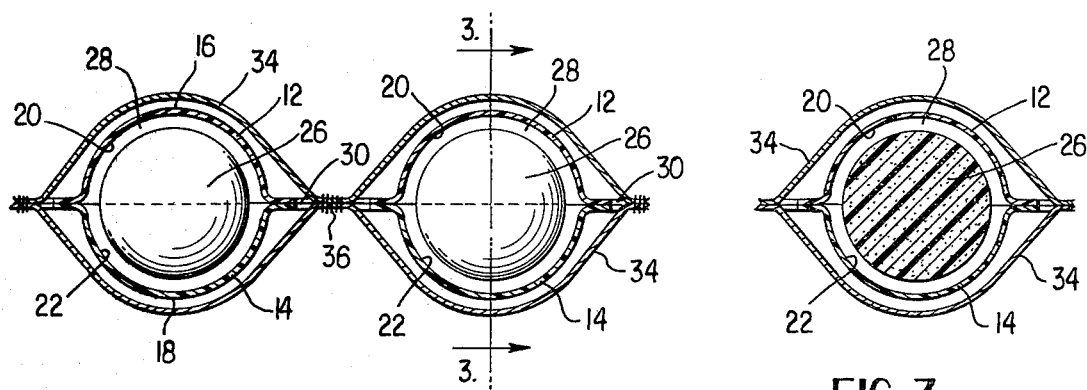
FIG. 2
FIG. 3
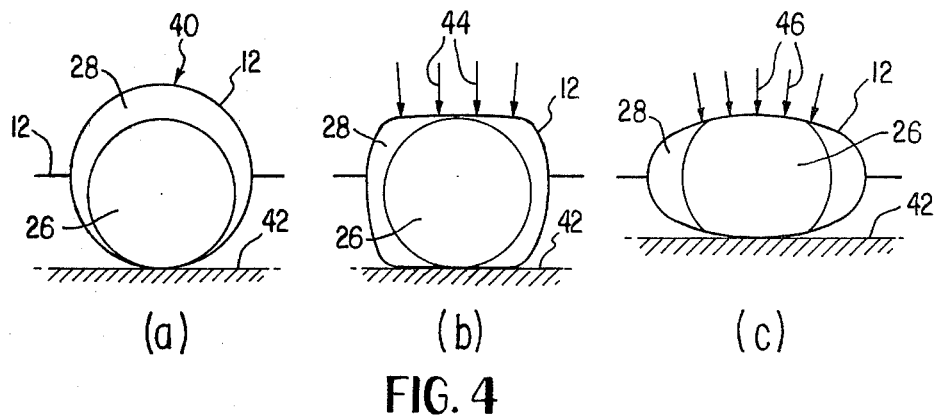
(a)      (b)      (c)
FIG. 4

LIGHTWEIGHT PROTECTIVE STRUCTURE

SUMMARY OF THE INVENTION

This invention relates to a lightweight protective structure and, more specifically, to a structure which can be placed adjacent and shaped to the contour of the object to be protected and which, due to its unique combination of pneumatic filled cells and foam cores, provides two stage protective resistance to concentrated loading.

Applicant is unaware of any protective structure which is constructed or functions in the manner of the subject invention. Protective structures of cells which are formed between layers of sheet material and filled with a pneumatic substance such as air have been known for some time. Such structures protect satisfactorily if the loading force against the cells is relatively light; however, when the loading forces are great, the cells often collapse due to expansion or rupturing of the material forming the cells. This results in a direct transmission of substantially all of the loading forces to the object being protected. If the object is a part of the human body, bruises, fractures or broken bones often result. Other protective structures are constructed in the manner disclosed in U.S. Pat. No. 4,032,683 wherein a sheet of low density plastic material has voids formed therethrough which serve primarily to reduce the weight of the structure rather than to serve any primary cushioning function, particularly when the loading forces applied are concentrated rather than spread over a large area of the structure.

Accordingly, it is an important object of the present invention to provide a structure which, due to its novel construction, provides two stage protective resistance to the transmission of concentrated loads.

It is another important object of the present invention to provide a protective structure which is capable of dissipating the force of a concentrated load over a large area thereby reducing the contact pressure adjacent the object to be protected.

It is another important object of the present invention to provide a protective structure having two protective stages, one stage of which will continue to function in the event that the other of the stages is rendered inoperative.

It is another important object of the present invention to provide a structure which can be adapted to be used either as protective clothing, or used as or in a protective device which can be placed under or over clothing to reduce the likelihood of injury to any part of the human body during the exercise of physically dangerous activities.

It is another important object of the present invention to provide a structure which, in addition to its load dissipating characteristics, is floatable, thermally insulative and fire retardant.

It is another object of the present invention to provide a structure capable of accomplishing all of the aforementioned objects which is lightweight and wear-resistant, inexpensive and simple to manufacture.

Briefly, these and other objects are attained by a protective structure which, in its simplest form, includes two layers of plastic sheet material, each layer having indentations which, when placed opposite each other, form cells containing a core of low density foam material, the shape of which is generally the shape of the cell itself, only smaller. The space surrounding the core is filled with a pneumatic substance at atmospheric pressure and the layers joined together by a seam weld around the periphery of each cell to seal in the pneumatic substance. Vent holes for the passage of air may be cut through the layers in the area adjacent the cells and any desired type of fabric material may be placed over the layers and joined together through the vent holes. The pneumatic cell thus formed provides a first stage of resistance to concentrated loading (an impact force) and the foam core provides a second stage of resistance thereto. This two stage resistance mechanism has the effect of spreading the concentrated load over a larger area such that the contact pressure on the object to be protected is greatly reduced.

BRIEF DESCRIPTION OF THE DRAWINGS

FIG. 1 is a top plan view of a portion of the protective structure of the present invention;

FIG. 2 is a cross-sectional view taken along the lines 2—2 of FIG. 1;

FIG. 3 is a cross-sectional view taken along the lines 3—3 of FIG. 2, and

FIGS. 4(a)-(c) are schematic representations of a single element of the protective structure under various loads.

DESCRIPTION OF PREFERRED EMBODIMENTS

Referring now to the drawing where like characters of reference indicate like parts in each of the several views, FIGS. 1, 2 and 3 show the protective structure 10 of the present invention. The protective structure 10 will be described in detail in conjunction with its primary use as a means of protecting parts of the human body from injury during contact sports, impacts, collisions, falls and the like. It is understood, of course, that the structure itself has numerous other uses, many of which will be discussed later. The protective structure 10 can be used as an integral part of the clothing itself worn by an individual, or it may be used in a more limited form as pads placed adjacent specific areas of the body such as the hips, knees or shoulders.

The protective structure 10 is comprised of a first sheet member 12 and a second sheet member 14 of plastic film material such as, for example, Kapton* manufactured by E. I. DuPont Co. which is flexible and will not restrict body movement of the wearer. The sheet members 12, 14 are each formed with a plurality of spaced-apart indentations 16, 18, respectively, which, when placed opposite each other, form cells 24. The indentations 16, 18 have inner walls 20, 22 respectively. The cells 24 thus formed can be of any shape such as the spherical shape shown or cylindrical, triangular or other, depending on the location on the clothing where the protective structure 10 is used. For example, cells 24 of spherical configuration afford greater flexibility and may be used adjacent movable joints such as knees, shoulders and elbows whereas a more cylindrically shaped cell 24 affords a more rigid structure for use in the chest, back or leg areas.

*Reg. Trademark

A core 26 is provided for each cell 24, the shape of which corresponds to the shape of the cell 24 into which it is placed. The core 26 shown is in the shape of a sphere and is made of, for example, low density polyurethane or silicone foam, formed in a conventional manner. The core 26 may be smaller in size than the cell 24 such that a space 28 is provided between the core 26 and the inner walls 20, 22. After the cores 26 have been placed in each identation 16 formed in the first sheet member 12, the second sheet member 14 with its corresponding indentations 18 is placed over the cores 26 and a heating element (not shown) is used to join the sheet members 12, 14 in the area around the cells 24 thus formed by a seam weld. If the space 28 surrounding each core 26 is to contain air, the joining process just described can be done openly at atmospheric pressure; however, if the space 28 is to contain an inert gas to increase the fire retarding properties of the structure 10, the joining process is done in a gas chamber containing the inert gas also at atmospheric pressure. The protective structure 10 thus far described is suitable by itself for use as padding which may be inserted in pockets in clothing adjacent the part of the anatomy to be protected; it may serve as a protective packing for delicate items in shipping containers or serve as a thermal insulation material.

In the event the protective structure 10 is to be used where an outer surface of plastic only is unsuitable, the outer surface of the first and second sheet members 12, 14 may be covered by fabric material 34 of any known type such as nylon, canvas, plain cloth or the like. The outer covering may be joined to the first and second sheet members 12, 14 by means of stitching, rivets or the like 36 passing through the sheet members 12, 14 in the area between the cells 24.

If the protective structure 10 is to be used as an item of protective clothing having the ability to breathe, a plurality of vent holes 30 may be formed through the first and second sheet members 12, 14 in the area 32 between the cells 24. A cover 34 of porous fabric such as nylon, canvas, cloth or the like can be placed adjacent to the outer surface of the first and second sheet members 12, 14 and secured together by stitching 36 through the vent holes 30. The thus covered protective structure 10 can be cut into various shapes which can be sewn together into an article of clothing to protect the human body during the exercise of physically dangerous activities. The porous fabric provides additional abrasion and puncture protection for the plastic film forming sheet members 12, 14 while permitting the clothing to breathe as aforementioned, thereby not causing overheating of the wearer.

In the event the protective structure 10 is to be used in an environment where the passage of air or other fluid through the structure is undesirable such as flotation devices, gymnastic or wrestling mats, thermal insulating clothing or the like, the vent holes 30 may be eliminated and the cover layers 34 joined to the first and second members 12, 14 by stitching rivets or the like 36 passing directly through the members 12, 14 in the area 32.

Referring now to FIGS. 4(a-c), FIG. 4(a) discloses in schematic form a single element 40 of the protective structure 10 of the invention resting against the object to be protected 42 with the core 26 adjacent the bottom of the cell 24. FIG. 4(b) shows a concentrated load 44 of medium force directed against the outer sheet member 46 consisting of first and second plastic sheet members 12, 14 as previously described. As can be seen under the load 44, the first sheet member 12 is deformed to a position adjacent the core 26 and compressing the pneumatic substance in the space 28 in the cell 24 thereby dissipating the force of the load 44 in a first protective stage. The pneumatic cell 24 thus provides uniform pressure over its area in contact with the object to be protected 42. FIG. 4(c) shows a concentrated load 46 of great force directed against the first sheet member 12 which, in addition to being sufficient to deform the outer sheet member 46 to the extent shown in FIG. 4(b), is also sufficient to deform the core 26 and bring into play the second protective stage. The foam core 26 also distributes the pressure uniformly over an increased area up to its point of collapse. In addition, the foam core 26 provides energy damping by both material hysteresis and the pressure loss damping phenomena. The foam core 26 also serves to maintain the shape of the cell 24 with its pneumatic substance in the event of a minor rupture of the first or second sheet members 12, 14 which would otherwise result in a collapsed and nonfunctional cell. Thus the two protective stages as aforementioned, the pneumatic cell 24 (FIG. 4(b)) and foam core 26 (FIG. 4(c)) each provide resistance to concentrated loading through its own mechanism in parallel. A compound cushioning effect thus results. Although the foam core 26 is shown unattached to the sheet members 12, 14, it could be formed integrally with one or both of the sheet members 12, 14.

The present invention has been described in detail above for purposes of illustration only and is not intended to be limited by this description or otherwise to exclude any variation or equivalent arrangement that would be apparent from or reasonably suggested by the foregoing disclosure to the skilled of the art.

What I claim is:

1. A protective structure comprising:
   a. a first sheet member having a plurality of spaced-apart, cup-shaped portions formed on the surface thereof,
   b. a second sheet member having a plurality of spaced-apart, cup-shaped portions formed on the surface thereof placed opposite said cup-shaped portions of said first sheet and being secured to said first sheet member to define the walls of separate cells containing a pneumatic substance, and
   c. a singular core means within each of said cells, said core means substantially conforming to the shape of said cells and being substantially surrounded by said pneumatic substance, such that, upon application of a concentrated load adjacent said first or second sheet member, compression of said pneumatic substance surrounding said core serves as the first stage of resistance to said concentrated load and said foam core provides a second stage of resistance to said concentrated load.

2. A protective structure as set forth in claim 1, further comprising cover means of flexible sheet material located around said cells.

3. A protective structure as set forth in claim 1 further comprising vent means through said first and second sheet members between any four of said cells.

4. A protective structure as set forth in claim 2 further comprising vent means through said first and second sheet members and wherein said cover means has a first cover layer substantially adjacent said first sheet member and a second cover layer against said second sheet member, said first and second cover layers being secured to each other in the area of said vent means.

5. A protective structure as set forth in claim 1 wherein said pneumatic substance is air.

6. A protective structure as set forth in claim 1 wherein said pneumatic substance is an inert gas.

7. A protective structure as set forth in claim 1 wherein said core is a low density, plastic foam material.

8. A protective structure as set forth in claim 2 wherein said cover means is a fabric-type material.

9. A protective structure as set forth in claim 1 wherein said first and second sheet members are of plastic film material.

* * * * *